United States Patent
Liu et al.

(10) Patent No.: US 12,479,466 B2
(45) Date of Patent: Nov. 25, 2025

(54) PRIVACY-RESPECTING DETECTION AND LOCALIZATION OF SOUNDS IN AUTONOMOUS DRIVING APPLICATIONS

(71) Applicant: Waymo LLC, Mountain View, CA (US)

(72) Inventors: Samuel Liu, Mountain View, CA (US); Jennifer Taylor, Palo Alto, CA (US); Ananya Misra, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 189 days.

(21) Appl. No.: 18/229,932

(22) Filed: Aug. 3, 2023

(65) Prior Publication Data
US 2025/0042431 A1 Feb. 6, 2025

(51) Int. Cl.
*G10L 15/08* (2006.01)
*B60W 60/00* (2020.01)
(Continued)

(52) U.S. Cl.
CPC ........... *B60W 60/001* (2020.02); *G10L 15/08* (2013.01); *G10L 15/20* (2013.01); *G10L 15/22* (2013.01);
(Continued)

(58) Field of Classification Search
CPC ........... B60W 60/001; B60W 2420/00; B60W 2554/80; B60W 2420/54;
(Continued)

(56) References Cited

U.S. PATENT DOCUMENTS 6,968,564 B1 * 11/2005 Srinivasan ............. H04H 20/31
725/19
8,213,633 B2 * 7/2012 Kobayashi ............. H04R 1/406
381/71.8

(Continued)

FOREIGN PATENT DOCUMENTS

JP 2016186813 A * 10/2016 ........... B60R 25/102

OTHER PUBLICATIONS

Suzuki Masahiro, Oct. 17, 2013, English Machine Translation_ JP2016186813A provided by Patent Translate by EPO and Google (Year: 2013).*

(Continued)

*Primary Examiner* — Ashley L Redhead, Jr.
(74) *Attorney, Agent, or Firm* — Lowenstein Sandler LLP

(57) ABSTRACT

The described aspects and implementations enable privacy-respecting detection, separation, and localization of sounds in vehicle environments. The techniques include obtaining, using audio detector(s) of a vehicle, a sound recording that includes a plurality of elemental sounds (ESs) in a driving environment of the vehicle, and processing, using a sound separation model, the sound recording to separate individual ESs of the plurality of ESs. The techniques further include identifying a content of individual ESs and causing a driving path of the vehicle to be modified in view of the identified content of the individual ESs. Further techniques include rendering speech imperceptibly by redacting temporal portions of the speech, using sound recognition models to identify and discard recordings of speech, and driving at speeds that exceed threshold speeds at which speech becomes imperceptible from noise masking.

20 Claims, 7 Drawing Sheets

(51) Int. Cl.
*G10L 15/20* (2006.01)
*G10L 15/22* (2006.01)
*G10L 25/51* (2013.01)

(52) U.S. Cl.
CPC .......... *G10L 25/51* (2013.01); *B60W 2420/00* (2013.01); *B60W 2554/80* (2020.02)

(58) Field of Classification Search
CPC .......... B60W 2554/4042; G10L 15/08; G10L 15/20; G10L 15/22; G10L 25/51; G10L 15/00; G10L 2021/02166; G10L 21/06; G10L 2015/223; G10L 21/0272; G01S 3/8006; G01S 3/8083; G01S 5/20; G06F 21/6245; G08G 1/0965; G08G 1/166
See application file for complete search history.

(56) References Cited

U.S. PATENT DOCUMENTS

| | | | |
|---|---|---|---|
| 11,610,599 B2* | 3/2023 | Grauman | G06N 3/063 |
| 2009/0323977 A1* | 12/2009 | Kobayashi | H04R 1/406 |
| | | | 381/71.8 |
| 2011/0142252 A1* | 6/2011 | Morito | G10L 21/0272 |
| | | | 381/92 |
| 2020/0398832 A1* | 12/2020 | Tzirkel-Hancock | |
| | | | B60W 30/0953 |
| 2022/0272448 A1* | 8/2022 | Rajkumar | H04R 1/08 |
| 2023/0261787 A1* | 8/2023 | Zhang | H04L 1/1614 |
| | | | 370/329 |

OTHER PUBLICATIONS

Partial European Search Report for European Application No. 24192639.3, mailed Nov. 15, 2024, 14 Pages.
Extended European Search Report for European Application No. 24192639.3, mailed Feb. 5, 2025, 12 Pages.

* cited by examiner

PRIVACY-RESPECTING DETECTION AND LOCALIZATION OF SOUNDS IN AUTONOMOUS DRIVING APPLICATIONS

TECHNICAL FIELD

The instant specification generally relates to autonomous vehicles and driver assistance systems. More specifically, the instant specification relates to efficient detection, identification, and localization of sounds by driver assistance systems and autonomous vehicles.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
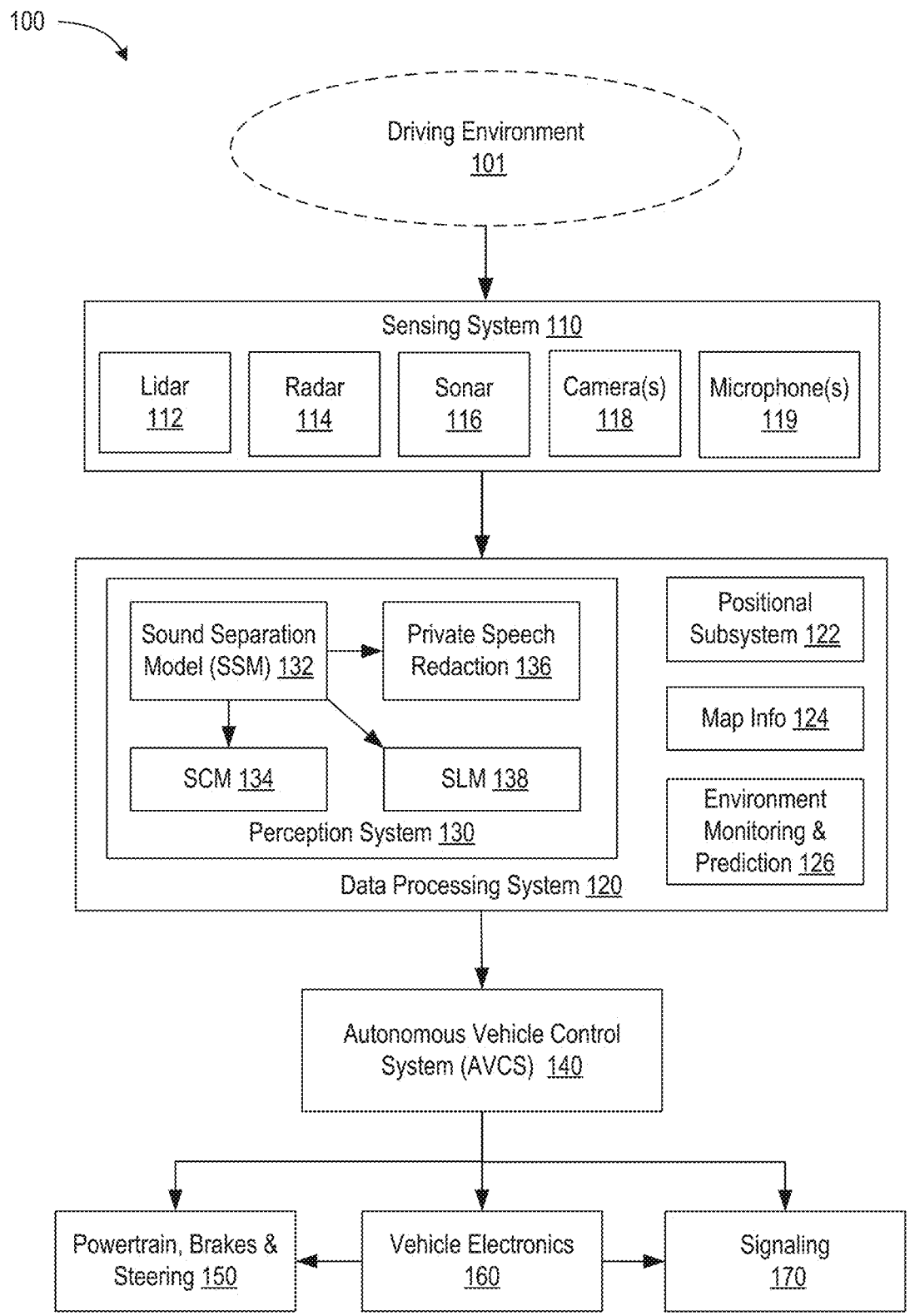
FIG. 1 is a diagram illustrating components of an example autonomous vehicle capable of using sound separation techniques that respect private conversations while allowing efficient detection and identification of sound-producing objects in vehicle environments, in accordance with some implementations of the present disclosure.

In one implementation, disclosed is a method that includes obtaining, using one or more audio detectors of a vehicle, a sound recording of a plurality of elemental sounds (ESs) in a driving environment of the vehicle. The method further includes processing, by a processing device and using a sound separation model, the sound recording to separate individual ESs of the plurality of ESs. The method further includes identifying a content of a first ES of the plurality of ESs, and causing, by the processing device, a driving path of the vehicle to be modified in view of the identified content of the first ES.

In another implementation, disclosed is a method that includes obtaining, using one or more audio detectors of a vehicle, a first sound recording of a sound in a driving environment of the vehicle. The method further includes generating, using a processing device and the first sound recording, a second sound recording, wherein the second sound recording renders imperceptible a speech present or potentially present in the first sound recording. The method further includes processing, using the processing device, the second sound recording to obtain an indication of presence of a sound-producing object in the driving environment of the vehicle; and causing, by the processing device, a driving path of the vehicle to be modified in view of the indication of presence of the sound-producing object.

In another implementation, disclosed is a system that includes a sensing system of a vehicle and a perception system of the vehicle. The sensing system includes one or more audio detectors to obtain a sound recording of a plurality of elemental sounds (ESs) generated in a driving environment of the vehicle. The perception system of the vehicle is to process, using a sound separation model, the sound recording to separate individual ESs of the plurality of ESs. The perception system is further to identify a content of a first ES of the plurality of ESs, and cause a driving path of the vehicle to be modified in view of the identified content of the first ES.

DETAILED DESCRIPTION

An autonomous vehicle or a vehicle deploying various driving assistance techniques can use multiple sensor modalities to facilitate detection of objects in an outside environment and determine a trajectory of motion of such objects. Such sensors can include radio detection and ranging (radar) sensors, light detection and ranging (lidar) sensors, multiple digital cameras, sonars, positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object. Cameras (e.g., photographic or video cameras) can acquire high resolution images at short and long distances and complement lidar and radar data.

Lidars, radars, and cameras (including infrared cameras) operate using electromagnetic waves with relatively small wavelengths (with radars having the longest wavelength in the centimeter range or even less). As a result, sensing data acquired by electromagnetic sensors is largely limited to direct line of sight detections. Human drivers, on the other hand, have sensory capabilities that extend beyond the line-of-sight perception. In particular, human drivers can hear sirens of approaching emergency vehicles while emergency vehicles are obscured by other vehicles or buildings, including situations where emergency vehicles approach along different (e.g., perpendicular) streets, and/or the like. Even though emergency vehicles may have recognizable shapes and appearances (e.g., fire trucks, ambulances, etc.) and are equipped with emergency lights, timely detection of emergency vehicles on rescue missions based solely on emergency lights detection and/or vehicle appearances and/or light is challenging and may be insufficient in many situations. Sound waves of emergency sirens, however, have wavelengths generally in the range of 20-70 centimeters and are thus very efficient in carrying sounds around obstacles. It is, therefore, advantageous to equip autonomous vehicles with robust sound detection and recognition capabilities. Further applications of sound sensing include recognizing speech that can be of importance to vehicle driving missions, including but not limited to instructions from police officers that can be given verbally, e.g., directing vehicles to detour in the instances of road closures, managing traffic in the instances of accidents and other traffic irregularities, and/or the like.

Detecting and efficiently processing sounds produced in typical driving environments is a challenging problem because of the presence of multiple sources of sound. Even though speech and sound recognition has been efficiently addressed by a number of machine learning approaches, most such approaches perform best for single-source audio data. Typical driving environments, on the other hand, can include irrelevant noise generated by multiple sources, such as vehicles and wind, speech produced by pedestrians (and other people), and/or other sounds that are usually of little relevance to driving missions. On some occasions, sounds can include sirens, railroad crossing bells, honks, police instructions, and/or other sounds that, when present, are of significant importance in charting a driving path of autonomous vehicles. Reliable and efficient detection and identification of such sounds remains an outstanding problem. This problem is made even more complicated by the need to preserve people's privacy and comply with various federal and state wiretapping laws. For example, collecting audio (inference and/or training) data during actual driving missions using microphone(s) placed on a vehicle may be problematic, if the audio data includes audio recordings of bystanders, pedestrians, passengers of the autonomous vehicle, and/or the like. Collecting training audio data using staged settings (e.g., using role-playing speakers in realistic or simulated driving environments) is expensive and time-consuming.

Aspects and implementations of the present disclosure address these and other challenges of the existing environment sensing technology by providing for methods and systems that efficiently collect audio data, both for training and during inference, while respecting privacy of people that are present in driving environments. In some implementations, a portion of audio data captured by the on-board microphone(s) may be redacted to a degree that makes discerning the content of people's conversation impossible. For example, during each time interval t (e.g., one second), a portion t/n of the interval t (e.g., half a second) of an audio data can be erased prior to storing (logging) the audio data and/or processing the audio data by a sound detection (recognition, classification) model. In some implementations, a full extent of the audio data may still be used (stored and/or processed) provided that a current speed of the vehicle is at least a threshold speed $v_0$ at which noise from wind masks conversations that can be overheard by the microphone(s). For example, field-testing shows that such threshold speed is about $v_0$~20-25 mph depending on a specific microphone model and sensitivity. In some implementations, a combination of both these techniques can be used, e.g., with audio redaction used at speeds below $v_0$ and full audio collected at speeds at or above $v_0$. In some implementations, a sound recognition model can be used that makes a threshold determination if private speech is being recorded and expunges (deletes) such speech and/or otherwise prevents the private speech from being stored for more than a transient amount of time (e.g., less than one second).

In some implementations, the collected audio data can first be processed by a front-end model—a sound separation model or SSM—that separates sounds by their sources. As disclosed in more detail below, an audio file generated by one or more microphone(s) can be processed by the SSM that generates separate audio files corresponding to elemental sources, which can include people, sounds of EVs, and sound generated by a collective source—designated as noise—from various vehicles, wind, and/or the like. Various additional source categories can be defined (e.g., warning sounds from backing-up vehicles, pedestrian crossing signals for blind people, and/or the like), as can be desired for various specific driving environments. Private speech and noise can be erased (e.g., not stored beyond the transient time for processing by SSM and decision-making) while public speech (valid speech), e.g., police and/or construction crews' instructions, can be stored for further content evaluation. In some implementations, stored audio files can retain phase information of the corresponding sources of sound so that subsequent processing by a sound localization model can identify directions to the sources. In some implementations, for more representative phase information, audio can be captured by multiple microphones placed at different locations around the vehicle.

The SSM can also be used for training data collection, to ensure privacy. For example, during training of the audio detection system to recognize sirens of emergency vehicles, conversations can be identified and filtered out (e.g., together with noise). Numerous other implementations and uses of the disclosed systems and techniques are illustrated below.

The advantages of the disclosed systems and techniques include, but are not limited to, efficient collection of audio data (during both training and inference) that is relevant for autonomous driving missions with privacy-respecting filtering of protected private conversations.

In those instances where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, timely and accurate detection of approaching EVs can be used to inform the driver that a change of the driving path may be needed (e.g., in Level 2 systems), or to make certain driving decisions (e.g., in Level 3 systems), such as reducing speed, pulling over to a side of the road, and/or the like, without requesting driver's feedback.

FIG. 1 is a diagram illustrating components of an example autonomous vehicle (AV) 100 capable of using sound separation techniques that respect private conversations while allowing efficient detection and identification of sound-producing objects in vehicle environments, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 (which can include one or more infrared sensors) to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can further include one or more sonars 116, which can be ultrasonic sonars, in some implementations. The sensing system 110 can also include one or more microphones 119, which can be positioned around AV 100. In some implementations, microphones 119 can be arranged into microphone arrays of two or more microphones each. AV 100 can have multiple such microphone arrays, e.g., four microphone arrays, eight microphone arrays, or some other number of microphone arrays. In one example, two microphone arrays can be deployed near front-left and front-right corners of AV 100 and two microphone arrays can be deployed near rear-left and rear-right corners of AV 100. In some implementations, different microphones of a given array can be located at distances of 1-5 centimeters from each other. In some implementations, microphones can be located at larger distances from each other, e.g., 10 cm or more.

The sensing data obtained by the sensing system 110 can be processed by a data processing system 120 of AV 100. The data processing system 120 can include a perception system 130. The perception system 130 can be configured to detect and track objects in the driving environment 101 and to recognize the detected objects. For example, the perception system 130 can analyze images captured by the cameras 118 and can further be capable of detecting traffic light signals, road signs, roadway layouts (e.g., boundaries of traffic lanes, topologies of intersections, designations of parking places, and so on), presence of obstacles, and the like. The perception system 130 can also receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include a number of components and/or modules that facilitate detection and localization of sound-producing objects using sound sensing and processing, as described herein. In some implementations, perception system 130 can deploy an SSM 132 that uses audio data Y collected by microphones 119 and apportions this data among multiple sources j=1 . . . N, such that $Y = X_1 + \ldots + X_K$, where the number of sources K and types of those sources currently present in the driving environment are not known apriori. The perception system 130 can also deploy a sound classification model (SCM) 134 that performs classification of sources j, e.g., among various predefined (during training of SCM 134) classes, such as sirens, noise, private speech, valid public speech, and/or the like. Private speech redaction module 136 can facilitate complete removal or partial suppression of identified (by SCM 134) private speech audio, e.g., by ensuring that private speech audio is not stored for more than a transient time (e.g., a fraction of a second necessary to determine that the speech is private), redacting periodic segments of speech such that the remaining portions of speech cannot be used for determination of the content of speech, and/or the like, or a combination of these techniques. The perception system 130 can further include a sound localization model (SLM) 138 that analyzes phase and amplitude of retained sounds $X_j$ and identifies locations, e.g., distances and directions to, the corresponding objects, including but not limited to emergency vehicles.

Perception system 130 can further receive information from a positioning subsystem 122, which can include a GPS transceiver and/or inertial measurement unit (IMU), configured to obtain information about the position of the AV relative to Earth and its surroundings. The positioning subsystem 122 can use the positioning data, e.g., GPS data and IMU data in conjunction with the sensing data to help accurately determine the location of the AV 100 with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animate objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various tracked objects of the driving environment 101 will be positioned within a prediction time horizon. The predictions can be based on the current locations and velocities of the tracked objects, including objects whose locations are determined using outputs of SLM 138. In some implementations, output of SLM 138 can be combined with outputs of lidar/radar/camera-based object tracking. For example, SLM 138 can determine an approximate distance and direction to a fire truck with a turned-on siren, and environment monitoring and prediction component 126 can identify an object (e.g., using lidar point cloud, camera images, etc.) that looks like a fire truck and combine the lidar/radar/camera data with the output of SLM 138 into data track that corresponds to the fire truck and tracks it trajectory as a function of time (e.g., as additional sensing data is collected). Using the data track (past locations and/or velocities of the fire truck), the environment monitoring and prediction component 126 can predict where the fire truck is likely to be within the next 3 or 5 seconds of motion. The environment monitoring and prediction component 126 can inform an autonomous driving system, such as AV control system (AVCS) 140, how a current trajectory of AV 100 is to be modified to allow safe passage of the fire truck.

The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 2:
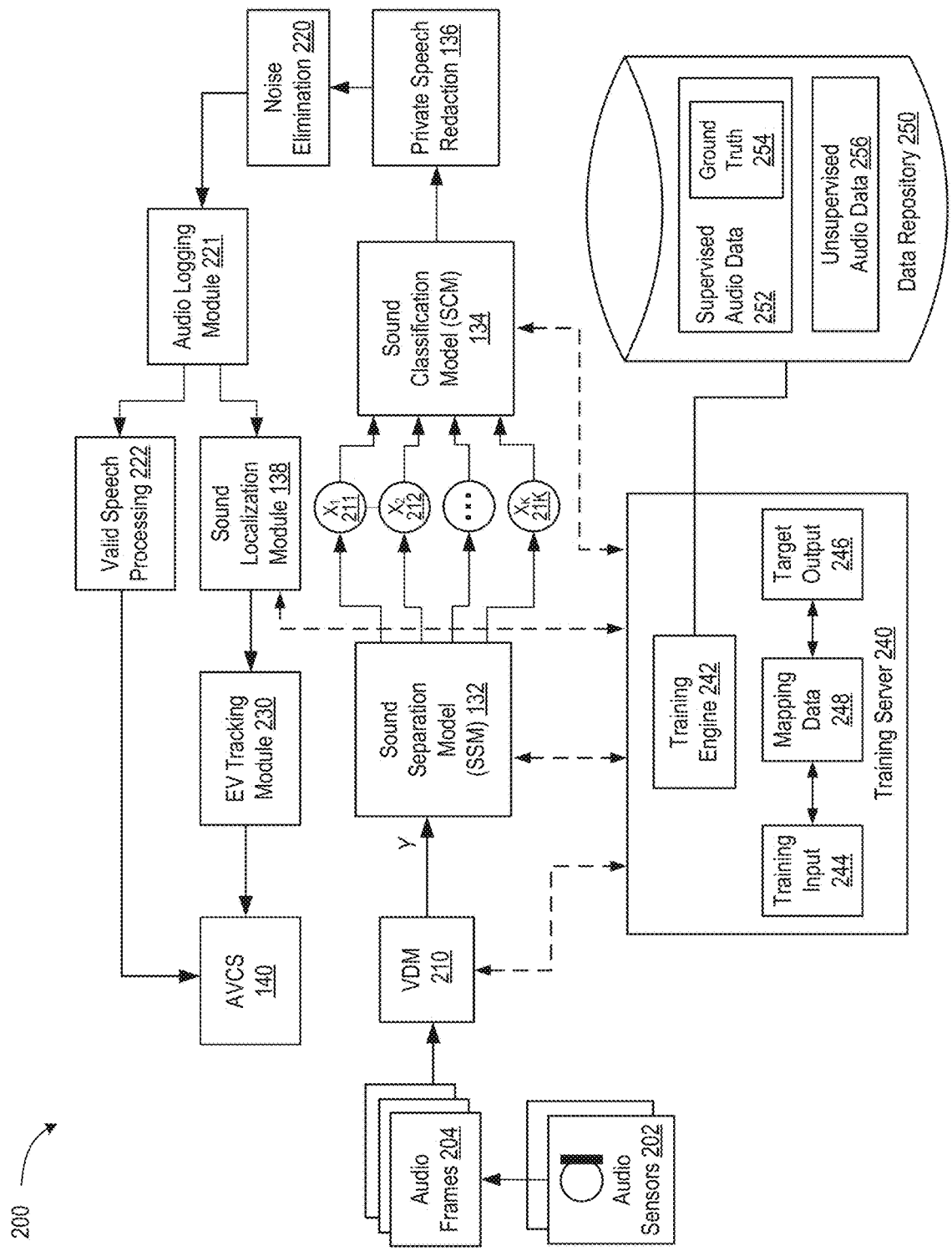
FIG. 2 is a diagram illustrating an example sound separation and processing pipeline that can be used as part of a vehicle's perception system for audio detection that respects privacy of people in driving environments, in accordance with some implementations of the present disclosure.

FIG. 2 is a diagram illustrating an example sound separation and processing pipeline 200 that can be used as part of a vehicle's perception system for audio detection that respects privacy of people in driving environments, in accordance with some implementations of the present disclosure. Sound separation and processing pipeline 200 can include audio sensors 202, which can include microphones 119 of FIG. 1, or one or more arrays of such microphones, e.g., located around the perimeter of a vehicle. Microphones in a microphone array can be located at distances of 1-5 cm from each other. In some implementations, microphones in an array can be located at distances smaller than 1 cm or larger than 5 cm (e.g., 10 cm or more). Microphones can be unidirectional (cardioid), bi-directional, omnidirectional microphones, dynamic microphones, multi-pattern microphones, and/or some combination thereof. In some implementations, an array of microphones can include directional microphones with different orientations of the maximum-sensitivity axis.

Sounds collected by audio sensors 202 can be in any suitable raw audio format, in spectrogram form, or in some other digital format. More specifically, an audio sensor 202 can convert variations of air pressure caused by arriving sound waves into analog electromagnetic signals, digitize the analog signals, and compute a short-time Fourier transform for various (overlapping) time intervals of a predetermined duration to obtain audio frames 204. Individual audio frames 204 can represent audio content in a respective time interval. In some implementations, the amplitude of the signals in the frequency domain can be represented using a logarithmic (decibel) scale. In some implementations, the spectrograms can be mel-spectrograms, with frequency f (measured in Hz) converted to the mel domain according to, $f \rightarrow m = 1607 \cdot \ln \ln (1+f/700)$, or a similar transformation.

Audio frames 204 can be input into a sound separation model (SSM) 132 trained to decompose collected sound combinations Y into a sum of some number k (which depends on a current state of the driving environment) elemental sounds 211, 212, ..., 21K: $Y = X_1 + X_2 + \ldots + X_K$. In some implementations, audio frames 204 can be first converted from the spectrogram representation into a sound embedding representation, e.g., using a Wav2vec algorithm or some other similar waveform-to-embedding converter. Generated embeddings can be treated as tokens that are inputted into a temporal model that operates on a sequence of tokens. Likewise, the output elemental sounds 211-21K can be in the embedding representation.

An input sound combination Y can be of any suitable duration and can include a corresponding number of frames (or respective sound embeddings). In some implementations, a separate sound embedding (or a separate set of sound embeddings) can represent a single frame. In one non-limiting example, a sound combination Y can be a 6-second audio segment having 0.5 sec frames with 0.1 sec overlap with a preceding frame and 0.1 sec overlap with a subsequent frame. Correspondingly, the 5-second audio segment will be represented via 15 frames (6÷(0.5−0.1)=15). These frames (embeddings) can be input into SSM 132 in parallel, sequentially, or as some combination thereof. In some implementations, SSM 132 can process multiple (e.g., M) sound combinations concurrently or using batch processing. In some implementations, various input sound combinations can partially overlap. In some implementations, the overlap can be substantial. For example, with a sliding window of 1 sec, adjacent 6-second audio segments can overlap for 5 seconds, to ensure that changes in the sounds present in the driving environment are tracked with sufficient resolution. The above numbers are intended as illustrations, as various other audio segment durations/sliding windows can be used (e.g., 1 sec segments with 0.2 sec sliding window, and/or the like). In some implementations, audio frames 204 can be processed by SSM 132 directly (without generating embedding representations for the frames), which outputs elemental sounds 211-21K. The elemental sounds 211-21K may then be converted into embeddings (by a suitable embeddings generator), which are then used for further processing (e.g., by SCM 134).

In some implementations, SSM 132 can include a convolutional neural network. In some implementations, convolutions can be performed across the time domain (across different frames) and across different features (embeddings) corresponding to a given frame. In some implementations, some convolutional layers of SSM 132 can be transposed convolutional layers. Some of the layers of SSM 132 can be fully connected layers. SSM 132 can further include one or more skipped connections and one or more batch normalization layers. In some implementations, instead of directly computing elemental sounds $X_1 \ldots X_K$, masks $\mu_j$ can be computed. Masks $\mu_j$ express various elemental sounds via an input combination Y: $X_j = \mu_j Y$, under the constraint that all masks sum up to unity, $\Sigma_j \mu_j = 1$.

Output of SSM 132 can be provided to a sound classification model (SCM) 134 that processes each elemental sound $X_j$ individually (e.g., sequentially or in parallel) and classifies elemental sounds $X_j$ by their most likely origins. SCM 134 can be trained to classify elemental sounds across any number of predetermined classes, e.g., a speech class, a noise class, an emergency vehicle signal class, and/or the like. In some implementations, SCM 134 can be trained to distinguish multiple emergency vehicle signals (e.g., as separate classes or subclasses), such as a police vehicle signal, a fire vehicle signal, an ambulance signal, and/or the like. SCM 134 can operate directly on elemental sound $X_j$ (e.g., a set of respective embeddings of elemental sound $X_j$). Since inputs into SCM 134 are filtered single-source inputs, SCM 134 can deploy any known techniques of sound classification, including but not limited to convolutional neural networks, fully-connected neural networks, a combination of the convolutional and fully-connected neural networks, recurrent neural networks, long short-term memory neural networks, neural networks with attention, and/or the like.

In some implementations, prior to SSM 132, an additional voice detection model (VDM) 210 can be deployed. VDM 210 can quickly identify if human voice is present in audio frames (e.g., using as short as 300-400 msec of sound) and redact portions of audio frames that include voice (e.g., to achieve a result that is similar to what private speech redaction module 136 achieves). In some implementations, VDM 210 can be deployed as part of private speech redaction module 136. In some implementations, VDM 210 can be deployed after elemental sounds 211-21K are obtained (e.g., prior to applying SCM 134 to the elemental sounds). In some implementations, VDM 210 can be part of SSM 132.

Elemental sounds $X_j$ classified by SCM 134 can be further processed by a private speech redaction module 136 and/or a noise elimination module 220. More specifically, private speech redaction module 136 can be applied to elemental sounds identified as speech by SCM 134 and can further determine if speech is of a private nature (e.g., speech by pedestrians, bystanders, passengers of the autonomous vehicle, and/or the like) or is a valid public speech (e.g., speech directed at the autonomous vehicle, such as speech by police officers, road workers, construction crew members, and/or the like). Elemental sounds $X_j$ that have been identified as belonging to private speech can be discarded. In some implementations, private speech redaction module 136 can be implemented as part of SCM 134, e.g., as an additional classifier head of SCM 134.

Noise elimination module 220 can discard elemental sounds $X_j$ that have been identified by SCM 134 as belonging to the noise class. Although shown as separate from SCM 134 and private speech redaction module 136, in some implementations, noise elimination module 220 can be integrated with SCM 134 and/or private speech redaction module 136.

In the implementation of FIG. 2, private speech redaction 136 is performed based on the output of SCM 134 (so that sounds that are identified as not belonging to private speech are not redacted). In some implementations, private speed redaction 136 can be performed prior to SCM 134, so that all elemental sounds $X_j$ are redacted.

Elemental sounds $X_j$ that have been identified as valid speech or as emergency sirens can be stored using audio logging module 221 and subjected to further processing. More specifically, valid speech processing 222 can include a speech recognition model trained to identify semantic content of speech based on digital embeddings of the corresponding elemental sounds $X_j$. A recognized content of the valid speech can be provided to the vehicle's AVCS 140 and used by AVCS 140 to modify a driving path of the autonomous vehicle. For example, valid speech processing 222 can determine that a police officer issued the order "road is closed, turn left and follow detour to Foothills Drive." AVCS 140 can make a left turn and remap the driving path to a current destination that passes through the Foothills Drive.

In the instances of elemental sounds $X_j$ that have been determined to correspond to sound signals (e.g., sirens) of emergency vehicles, a sound localization module 138 can use elemental sounds $X_j$ to identify directions and distances to emergency vehicles. In some implementations, elemental sounds $X_j$ can first be converted back to the spectrogram representation. The spectrogram representation can include phase information carried by emergency sounds, including phase differences of signals detected by different microphones or arrays of microphones. Sound localization module 138 can use this information to estimate the current location of the emergency vehicle(s). Emergency vehicle tracking module 230 can track a time series of estimated locations of the emergency vehicle(s) to identify the current and projected trajectory of the vehicle(s) and can pass such trajectory(ies) to AVCS 140. Having received emergency vehicle(s) trajectory(ies), AVCS 140 can determine when and where the autonomous vehicle should stop to allow safe passage of the emergency vehicle(s) and can further determine when it is safe to resume the motion. In some implementations, emergency vehicle tracking module 230 can use additional sensing data obtained by optical (e.g., lidar/radar/camera) sensors, e.g., by matching locations of the emergency vehicles estimated by sound localization module 138 with locations of objects that appear like emergency vehicles on lidar/radar/camera images (if emergency vehicle(s) are within a direct line-of-sight from the autonomous vehicle). Once such matching across different sensing modalities is accomplished, emergency vehicle tracking module 230 can determine location of emergency vehicle(s) with a higher accuracy enabled by the optical sensors.

Various models shown in FIG. 2, e.g., SSM 132, SCM 134, private speech redaction module 136, VDM 210, valid speech processing 222, and/or sound localization module 138 can be trained by a training server 240. The models can be trained (as disclosed in conjunction with SSM 132 training in more detail in FIG. 3) using recorded sounds of actual driving environments, including urban driving environments, highway driving environments, rural driving environments, off-road driving environments, and/or the like. In the instances of supervised training, training data can be annotated with ground truth, which can include correct identification of sound sources in training sound recordings. In some implementations, annotations may be made using human inputs. Training can be performed by a training engine 242 hosted by training server 240, which can be an outside server that deploys one or more processing devices, e.g., central processing units (CPUs), graphics processing units (GPUs), and/or the like. In some implementations, some or all of the models can be trained by training engine 242 and subsequently downloaded onto the perception system of the autonomous vehicle. Various models illustrated in FIG. 2 can be trained using training data that includes training inputs 244 and corresponding target outputs 246 (correct matches for the respective training inputs). During training of the models, training engine 242 can find patterns in the training data that maps each training input 244 to a respective target output 246.

Training engine 242 can have access to a data repository 250 that stores supervised audio data 252, which can include ground truth 254 (used in the instances of supervised training) for actual driving situations in a variety of environments. Training data stored in data repository 250 can include large datasets, e.g., with thousands or tens of thousands of sound recordings. In some implementations, ground truth 254 can be made by a developer before the annotated training data is placed into data repository 250. Training engine 242 can further store unsupervised audio data 256 that does not have annotations (and is used in the instances of unsupervised training). During training, training server 240 can retrieve annotated or unannotated training data from data repository 250, including one or more training inputs 244 and one or more target outputs 246. Training data can also include mapping data 248 that maps training inputs 244 to the target outputs 246.

During training of the models, training engine 242 can change parameters (e.g., weights and biases) of the models until the models successfully learn how to perform respective tasks, e.g., to separate sound combinations into elemental sounds (target outputs 246). In some implementations, various models of FIG. 2 can be trained separately. In some implementations, the models can be trained together (e.g., concurrently). Different models can have different architectures (e.g., different numbers of neuron layers and different topologies of neural connections) and can have different settings (e.g., activation functions, etc.) and can be trained using different hyperparameters.

The data repository 250 can be a persistent storage capable of storing lidar data, camera images, as well as data structures configured to facilitate accurate and fast identification and validation of sign detections, in accordance with various implementations of the present disclosure. Data repository 250 be hosted by one or more storage devices, such as main memory, magnetic or optical storage disks, tapes, or hard drives, network-attached storage (NAS), storage area network (SAN), and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 3).

Figure 3:
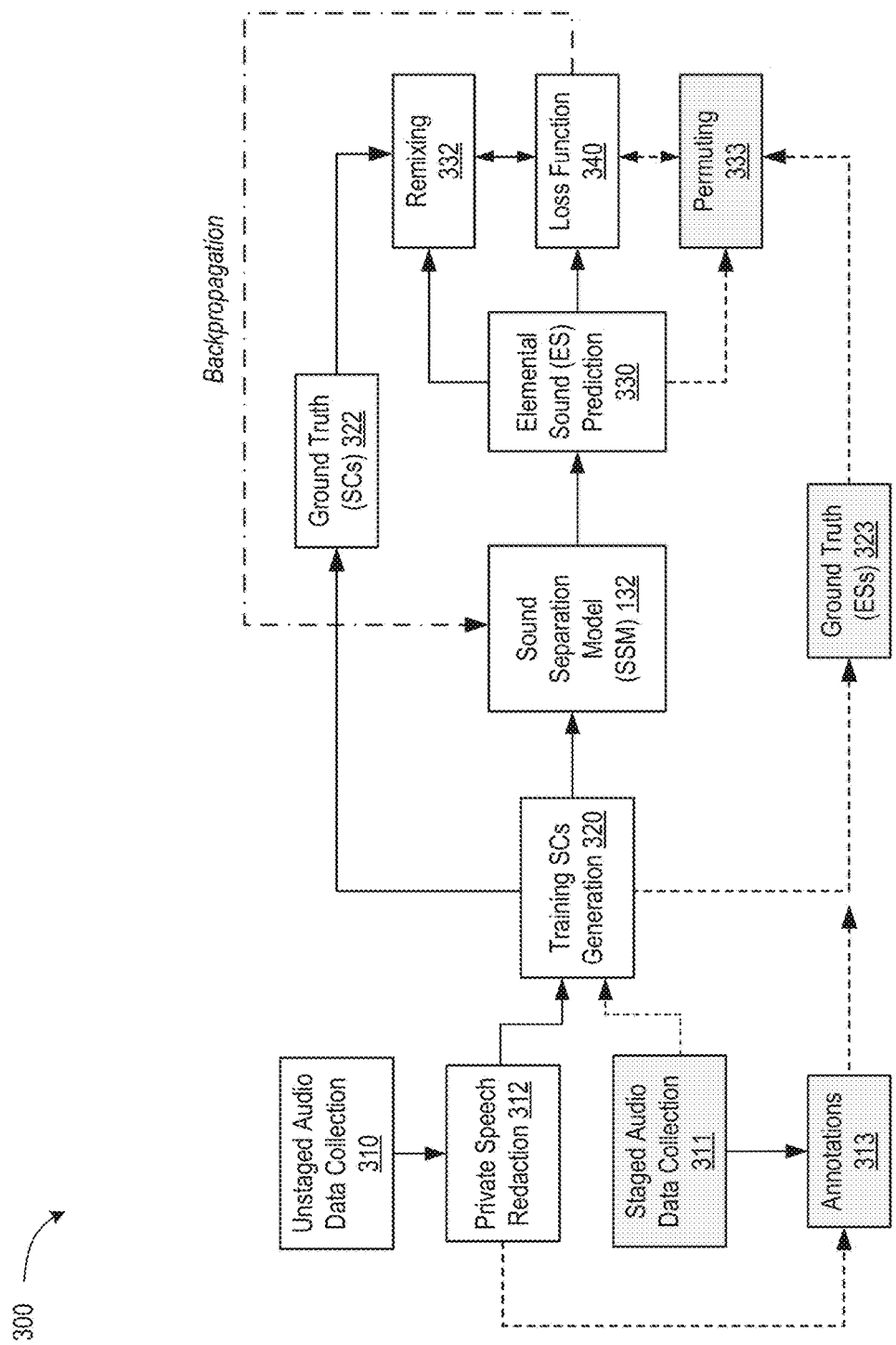
FIG. 3 illustrates an example data flow of training of a sound separation model that can be used for efficient audio separation and detection in driving environments, in accordance with some implementations of the present disclosure.

In implementations disclosed above in conjunction with FIG. 3, collection of audio data (e.g. by audio sensors 202) and processing the audio data (using SSM 132, SCM 134, and/or other models) is performed on the same autonomous vehicle. In other implementations, audio collection of audio data and processing of the audio data can be performed by different entities. For example, audio sensors 202 can be located on one vehicle and processing of audio frames 204 collected by audio sensors 202 can be performed on a different vehicle (e.g., a dispatch/support vehicle of an autonomous vehicle fleet), on a central (dispatch) server, and/or some other remote agent. After audio frames 204 are processed by the remote agent, the remote agent can communicate the results of the processing to the autonomous vehicle (or to other vehicles located near the area where audio frames 204 were collected), including presence of and/or estimated locations of emergency vehicles in the area of the autonomous vehicle. In such implementations, some portion of audio processing can be performed by the agent that collects audio frames 202, e.g., detection and removal (or suppression) of private speech can be performed by such an agent prior to communicating the audio data to a different agent (e.g., the dispatch server).

FIG. 3 illustrates an example data flow of training 300 of a sound separation model 132 that can be used for efficient audio separation and detection in driving environments, in accordance with some implementations of the present disclosure. Training illustrated in FIG. 3 can include unsupervised training and supervised training, with operations of supervised training illustrated with the shaded blocks. During unsupervised training, training 300 can include unstaged audio data collection 310, e.g., recording of audio data during various driving missions, such as autonomous driving missions and/or driver-operated missions. In some implementations, recording of audio data can be performed using microphones that are similar to microphones that are used by autonomous vehicles with the trained sound separation model 132 deployed. In some implementations, the collected training audio data can undergo private speech redaction 312 that can deploy a variety of techniques, including but not limited to elimination of a portion of audio frames to a point where the remaining audio frames cannot be used for speech transcription. In some implementations, private speech redaction 312 can include processing the collected audio data though a basic speech recognition model and discarding any portion of the data where a human speech or voice is detected.

The remaining/redacted audio data can be used for generation of training sound combinations (SCs) 320. SSM 132 can be trained to detect up to N elemental sounds, each elemental sound corresponding to a separate source of the sound. The number N can be set based on expected number of sources in typical driving environments and can be equal to a number of channels of SSM 132, e.g., N=2, 3, 4, 8, and or the like. In some implementations, SSM 132 can be trained to process concurrently M sound combinations $Y_1 \ldots Y_M$ used as inputs into SSM 132, where M=2, 3, 4, etc. For example, a whole set of training sound combinations $\{Y_i\}$ can be input into SSM 132 in parallel. In some implementations, the set of training sound combinations $\{Y_i\}$ can be input into SSM 132 sequentially, e.g., as part of the same batch. Each $Y_i$ can initially include a sequence of frames that are then converted into spectrograms (e.g., mel-spectrograms).

SSM 132 can be trained to output, for each sound combination $Y_i$, a corresponding representation via a sum of elemental sounds $X_1 \ldots X_N$. Each output elemental sound $X_i$ can represent a set of spectrograms determined by SSM 132 to have been produced by a single source while filtering out overlapping sounds that are determined to have been produced by other sources. During training, SSM 132 learns to perform such determination and filtering more and more accurately. SSM 132 processes an input batch of sound combinations $Y_1 \ldots Y_M$ and generates an elemental sound prediction 330, which can be a matrix A of elements $\alpha_{ij}$ that represent the input sound combinations via predicted elemental sounds $X_1 \ldots X_N$:

$$Y_i = \sum_{j=1}^{N} \alpha_{ij} X_j.$$

In some implementations, each matrix element $\alpha_{ij}$ can have value 0, indicating that a given elemental sound $X_j$ is absent in sound combination $Y_i$, or value 1, indicating that the elemental sound $X_j$ is present in sound combination $Y_i$. Matrix A of elements $\{\alpha_{ij}\}$ is, therefore, an M×N matrix. During each cycle, SSM 132 can output a given row $\alpha_{i1}, \alpha_{i2}, \ldots, \alpha_{iN}$ representing decomposition of sound combination $Y_i$ into respective elemental sounds (over N output channels). In any given row as few as one matrix element or as many as N matrix elements can be nonzero, depending on the number of sources that produced sound combination $Y_i$. In some instances, the number of identified elemental sounds K may be less than N. In such instances, the last N–K output columns can be null columns with zero elements. Arrangement of columns in the output matrix A may have no special significance, as SSM 132 need not be expected (and/or trained) to predict elemental sounds in any rigid order. This improves flexibility of SSM 132 in situations where sources with unexpected audio characteristics are combined.

In unsupervised training implementations, ground truth about decomposition of sound combinations into elemental sounds $X_1 \ldots X_N$ can be absent. In such instances, ground truth 322 can include the training inputs, e.g., sound combinations $Y_1 \ldots Y_M$, themselves. To determine accuracy of $\{Y_1 \ldots Y_M\} \rightarrow \{X_1 \ldots X_K\}$ decomposition, training 300 can include remixing 332 the identified elemental sounds into various possible source combinations of K identified elemental sounds $X_1 \ldots X_K$, in which at least one elemental sound is included. Since there are $2^K$ possibilities to include or exclude any given $X_K$, the number of different nonzero sound combinations is $2^K - 1$. Each of $2^K - 1$ combinations generated by remixing 332 can be compared with each one of M input (ground truth) sound combinations $Y_i$. Correspondingly, for each ground truth $Y_i$, a loss function 340 can be computed for each of $2^K - 1$ generated sound combinations and a remixed sound combination $\hat{Y}_i$ with the lowest loss function 340 can be computed. This identified remixed sound combination $\hat{Y}_i$ is then treated as the training output, which approximates the (ground truth) target output $Y_i$. Such training output/target output pairs $\hat{Y}_i / Y_i$ are then used to compute a set of errors, $\hat{Y}_1 - Y_1, \hat{Y}_2 - Y_2, \ldots, \hat{Y}_M - Y_M$. The errors can be backpropagated, e.g., using various techniques of gradient descent, through various layers of SSM 132 and parameters (e.g., weights and biases) of SSM 132 can be modified to reduce these differences $\{\hat{Y}_i - Y_i\}$. The loss function 340 can be a squared error loss function, a logarithmic squared error loss function, or any other suitable loss function.

The described training operations can be repeated for multiple sets of training inputs $\{Y_1 \ldots Y_M\}$ (which are also used as target outputs for remixed sound combination), until SSM 132 is trained to the target level of accuracy. Unsupervised training (indicated with white blocks in FIG. 3) enables training of SSM 132 without human annotations, which can be expensive and/or difficult to obtain.

In some implementations, nonetheless, unsupervised training can be supplemented by (or replaced with) supervised training (shaded boxes in FIG. 3). More specifically, during supervised training, a staged audio data collection 311 can be used and can include recording sounds that are encountered in typical driving environments, such as vehicle engine sounds, tire noise, wind sounds, emergency vehicles sirens, and/or the like. Staged audio data collection 311 can further include recorded conversations by actors. Since staged conversations are not private, private speech redaction 312 need not be used. In some implementations, additional training data can be derived using unstaged audio data collection 310 (e.g., after private speech redaction 312), which can then be human-annotated. Annotations 313 can identify various elemental sounds $X_1 \ldots X_N$, e.g., as noise (engine, tires, wind, etc.), speech, sounds of emergency vehicles, and/or the like.

Various recorded $Y_1 \ldots Y_M$ can be processed by SSM 132, e.g., as described above in conjunction with the unsupervised training with SSM 132, that outputs a set of elemental sounds $\hat{X}_1 \ldots \hat{X}_k$ as part of elemental sound prediction 330. In supervised training, ground truth 323 about specific elemental sounds $X_1 \ldots X_k$ can be available. Accuracy of mapping $Y_i \rightarrow \{\hat{X}_1 \ldots \hat{X}_k\}$ can be evaluated for each $Y_i$ individually. More specifically, because SSM 132 can be agnostic about the order of the predicted $\hat{X}_1 \ldots \hat{X}_K$, permuting 333 can generate K! possible permutations of the identified elemental sounds $\hat{X}_1 \ldots \hat{X}_K$ and compare each permutation with the ground truth 323 $X_1 \ldots X_K$. Correspondingly, loss function 340 can be computed for each of K! generated permutations of $\hat{X}_1 \ldots \hat{X}_K$ and the ground truth 323 $X_1 \ldots X_K$. The permutation with the lowest loss function 340 value can then be treated as the training output, which approximates the target output (ground truth 323) $X_1 \ldots X_K$. The loss function 340 computed for the differences, $\hat{X}_1 - X_1, \hat{X}_2 - X_2, \ldots, \hat{X}_K - X_K$, can then be backpropagated through various layers of SSM 132 and parameters (e.g., weights and biases) of SSM 132 can be modified to reduce these differences.

Figure 4:
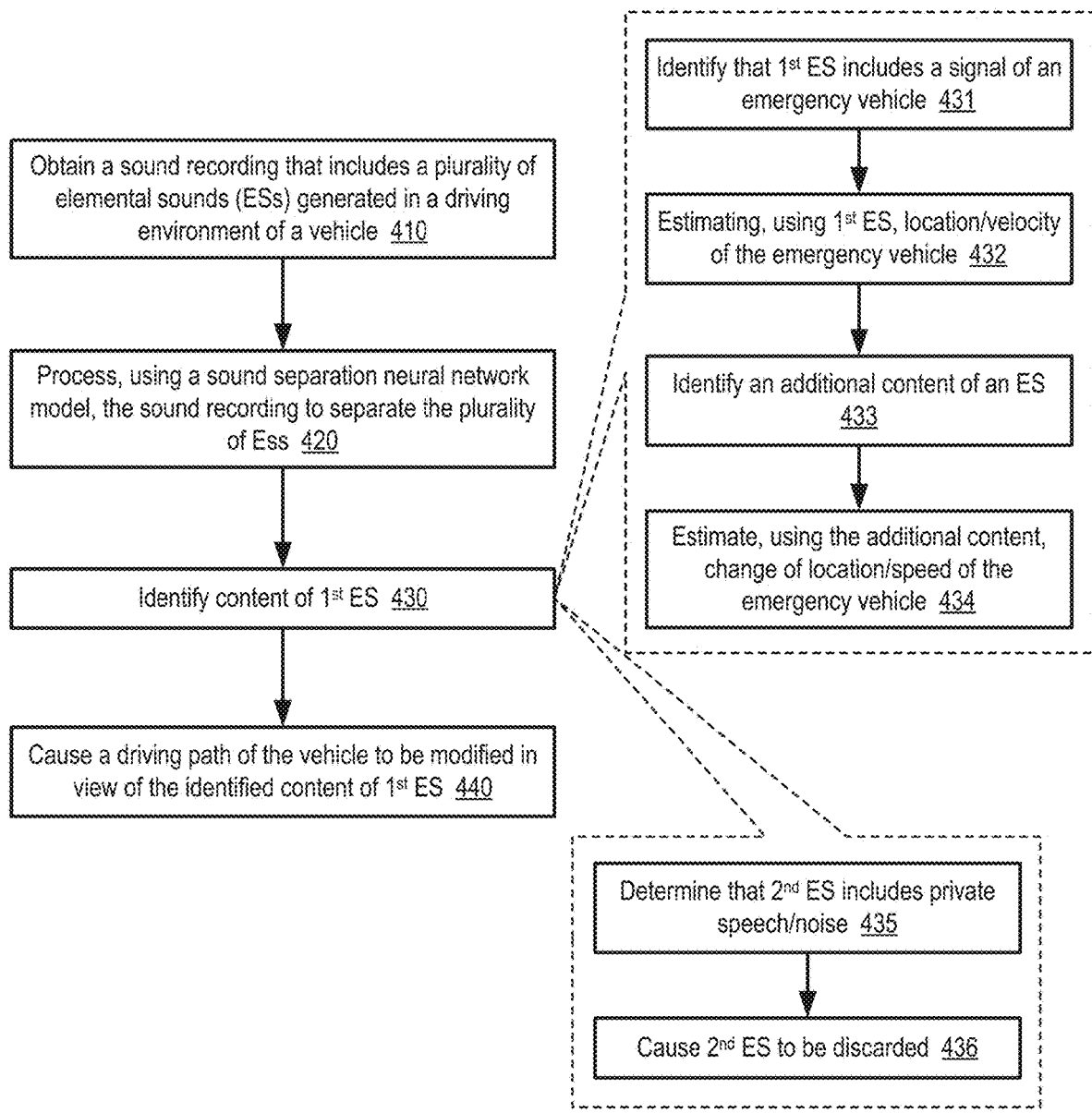
FIG. 4 is a flow chart illustrating an example method of using a sound separation model for privacy-respecting identification and tracking of objects in driving environments, in accordance with some implementations of the present disclosure.
Figure 5:
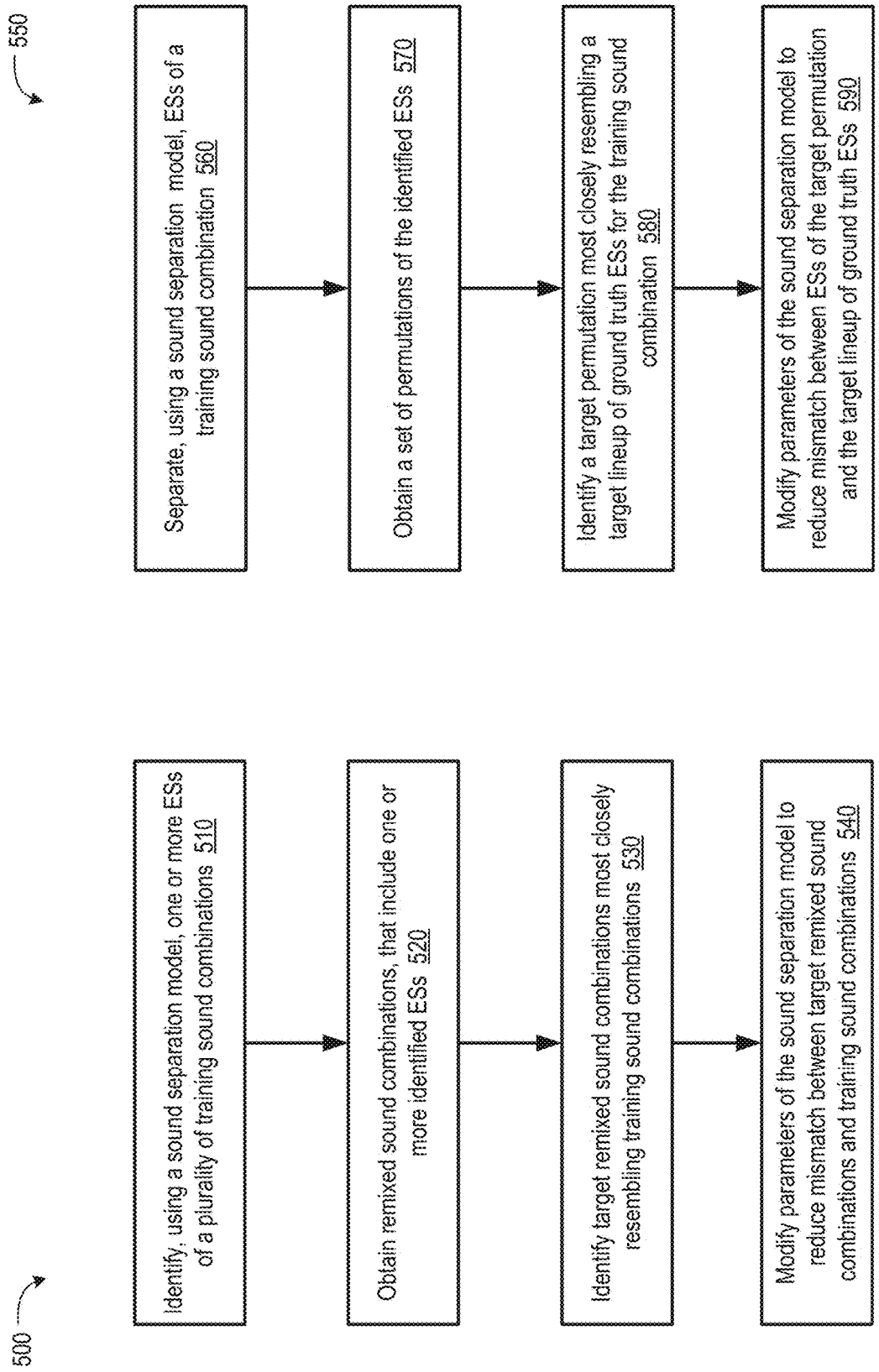
FIG. 5A is a flow chart of an example method of unsupervised training of a sound separation model for efficient privacy-respecting audio detection in driving environments, in accordance with some implementations of the present disclosure.
FIG. 5B is a flow chart of an example method of unsupervised training of a sound separation model for efficient privacy-respecting audio detection in driving environments, in accordance with some implementations of the present disclosure.
Figure 6:
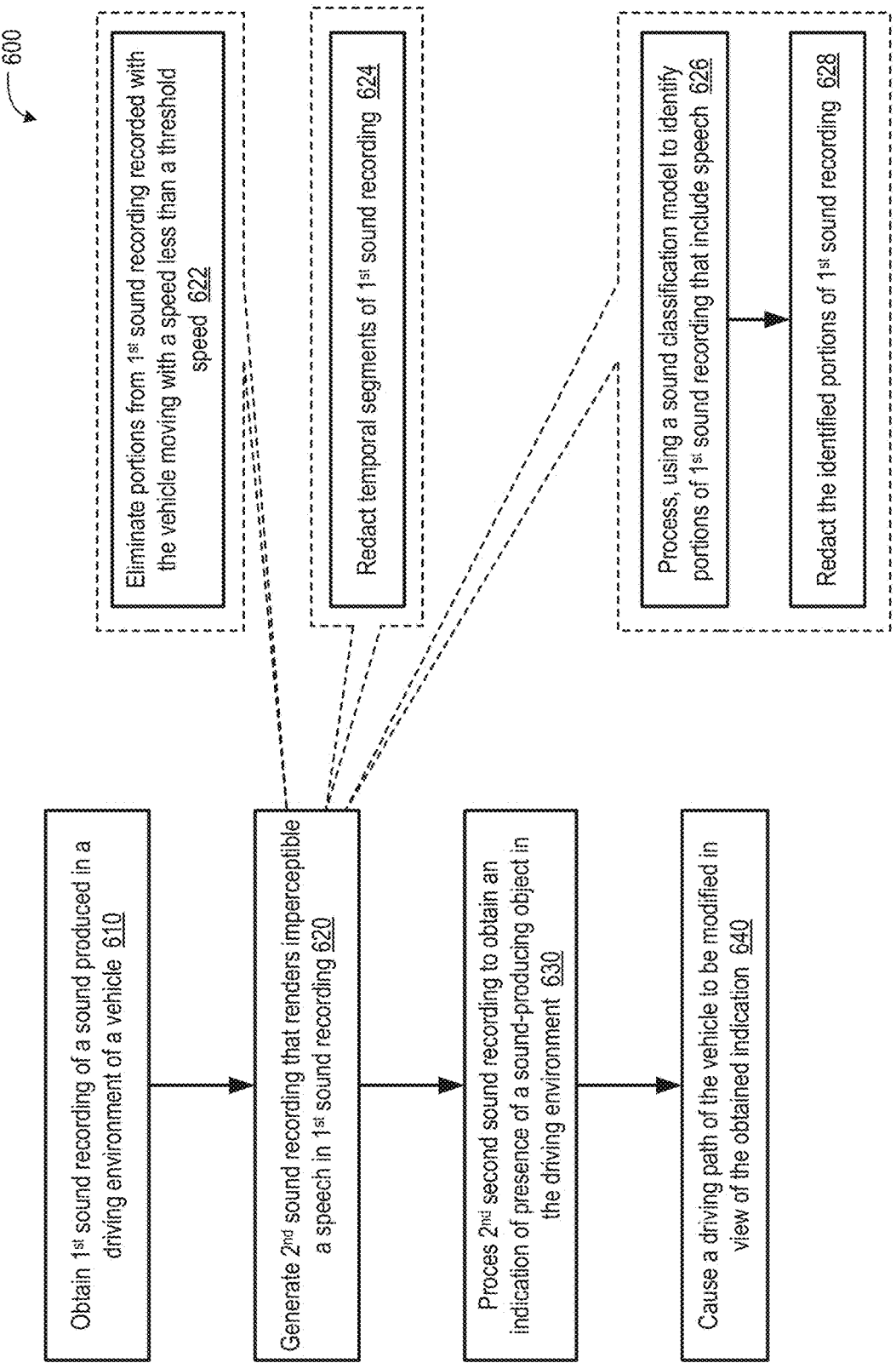
FIG. 6 is a flow chart illustrating another example method of using sound detection for privacy-respecting identification and tracking of objects in driving environments, in accordance with some implementations of the present disclosure.

FIGS. 4-6 illustrate methods 400-600 of using and training sound separation systems techniques that respect privacy of people's conversations while allowing efficient detection and identification of sound-producing objects in vehicle environments. A processing device, having one or more processing units (CPUs), and/or one or more graphics processing units (GPUs), and memory devices communicatively coupled to the CPU(s) and/or GPUs can perform methods 400-600 and/or each of their individual functions, routines, subroutines, or operations. Methods 400-600 can be directed to systems and components of a vehicle. In some implementations, the vehicle can be an autonomous vehicle (AV), such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The processing device executing methods 400-600 can perform instructions issued by various components of the perception system 130 of FIG. 1, e.g., SSM 132, SCM 134, SLM 138. Methods 400-600 can be used to improve performance of the autonomous vehicle control system 140. In certain implementations, a single processing thread can perform each of methods 400-600. Alternatively, two or more processing threads can perform each of methods 400-600, each thread executing one or more individual functions, routines, subroutines, or operations of the methods. In an illustrative example, the processing threads implementing methods 400-600 can be synchronized (e.g., using semaphores, critical sections, and/or other thread synchronization mechanisms). Alternatively, the processing threads implementing methods 400-600 can be executed asynchronously with respect to each other. Various operations of methods 400-600 can be performed in a different (e.g., reversed) order compared with the order shown in FIGS. 4-6. Some operations of methods 400-600 can be performed concurrently with other operations. Some operations can be optional.

FIG. 4 is a flow chart illustrating an example method 400 of using a sound separation model for privacy-respecting identification and tracking of objects in driving environments, in accordance with some implementations of the present disclosure. At block 410, method 400 can include obtaining, using one or more audio detectors of a vehicle, a sound recording. The sound recording can include a plurality of elemental sounds (ESs) generated in a driving environment of the vehicle, e.g., noise from wind and multiple vehicles, honking, emergency vehicle sirens, pedestrian/bystander conversations, and so on. At block 420, method 400 can include processing, using a sound separation model (e.g., SSM 132), the sound recording to separate individual ESs of the plurality of ESs, e.g., into elemental sounds $X_1 \ldots X_K$ 211-21K in FIG. 2.

At block 430, method 400 can include identifying a content of a first ES of the plurality of ESs. (The terms "first" and "second" should be understood herein as mere identifiers and do not presuppose any temporal or semantic order.) In some implementations, identifying the content of the first ES at block 430 can include one or more operations illustrated in the top callout portion in FIG. 4. More specifically, at block 431, method 400 can include identifying, using a sound classification model (e.g., SCM 134) that the first ES includes a signal of an emergency vehicle. At block 432, method 400 can continue with estimating, using the content of the first ES, a location (e.g., distance and direction to) and/or a velocity of the emergency vehicle at a first time (e.g., velocity relative to the AV). For example, location of the emergency vehicle can be estimated from a direction of the incoming sound, e.g., based on phase information captured by multiple audio detectors. Velocity of the emergency vehicle can be estimated based on the detected frequency of the signal of the emergency vehicle (e.g., a siren) and a comparison of the detected frequency to a known frequency of the signal. For example, if a known frequency of the signal is f, the velocity of the emergency vehicle V can be determined based on the detected Doppler frequency shift $\Delta f$ according to $$V = \frac{c \Delta f}{2f}$$

(in an 2f example of a stationary autonomous vehicle), where c is the speed of sound in air (c≈340 m/sec). In some implementations, the location (e.g., coordinates in any suitable system of coordinates) and/or velocity of the emergency vehicle can be determined using additional lidar data, radar data, and/or camera data, e.g., by identifying objects whose appearance matches a known appearance of an emergency vehicle. Positive Doppler shifts $\Delta f > 0$ correspond to sound-emitting objects that approach the audio sensor while negative doppler shifts $\Delta f < 0$ correspond to sound-emitting objects that move away from the audio sensor. In some implementations, intensity (loudness) of the incoming sound can be used to estimate the location of the emergency vehicle, alone or in combination with the sound Doppler frequency data.

Blocks 433-434 can be directed to tracking of emergency vehicles. More specifically, at block 433, method 400 can include identifying an additional content of at least one ES of an additional plurality of ESs, e.g., based on audio recordings collected at a second time and processed as disclosed in conjunction with FIG. 2, in one example. At block 434, method 400 can include estimating, using the additional content, at least one of a change of the location of the emergency vehicle between the first time and the second time (e.g., based on the change of the direction and intensity of the detected audio signals), or the velocity of the emergency vehicle at the second time (e.g., from the new sound Doppler shift measured at the second time). The data used for tracking the emergency vehicle at the second time can also include lidar/radar/camera data, similarly to the measurements taken at the first time. In some implementations, the change of the location of the emergency vehicle between the first time and the second time can be estimated in further view of the change in the intensity (loudness) of the detected sound signal, e.g., with increasing intensity indicating that the emergency vehicle is approaching and decreasing intensity indicating that the emergency vehicle is moving away from the autonomous vehicle.

Blocks 435-436 can be directed to handling sound content that is not produced by emergency vehicles. More specifically, at block 435, method 400 can include determining that a second ES of the plurality of ESs includes a private speech and/or noise (e.g., vehicle noise, wind noise) and, at block 436, causing a sound buffering with the second ES to be discarded. The term "buffering" should be understood as storing information (e.g., sound data) for no more than a transient duration (e.g., less than one second, less than half of a second, and/or the like), typically in volatile memory (e.g., RAM). The term "discarded" should be understood as including actively erasing or deleting data (e.g., from volatile memory) with the second ES or passively failing to store the data with the second ES, for more than the transient duration.

In some implementations, operations of block 430 can include identifying, using the sound classification model, that the content of the first (or some other) ES includes a speech directed at the vehicle, e.g., a driving path instruction issued by an authority, such as a police officer, construction crew, and/or the like.

At block 440, method 400 can continue with causing a driving path of the vehicle to be modified in view of the identified content of the first ES, e.g., stopping and/or slowing down the vehicle in response to an approaching emergency vehicle, stopping/slowing down/taking a detour responsive to the driving path instruction, and/or the like.

FIG. 5A is a flow chart of an example method 500 of unsupervised training of a sound separation model for efficient privacy-respecting audio detection in driving environments, in accordance with some implementations of the present disclosure. Method 500 can be performed using a broad variety of training data, including data that does not have annotations. Operations of method 500 of unsupervised training can be performed by training server 240 of FIG. 2, e.g., as illustrated in FIG. 3. At block 510, method 500 can include identifying, using the sound separation model (e.g., SSM 132), one or more ESs (e.g., $X_1 \ldots X_K$). of a plurality of training sound combinations (e.g., $Y_1 \ldots Y_M$). At block 520, method 500 can continue with obtaining a set of remixed sound combinations, each of the set of remixed sound combinations including one or more identified ESs. At block 530, method 500 can include identifying a plurality of target remixed sound combinations most closely resembling the plurality of training sound combinations (e.g., $\hat{Y}_1 \ldots \hat{Y}_M$). At block 540, method 500 can continue with modifying parameters of the sound separation model to reduce a mismatch (e.g., $\hat{Y}_1-Y_1, \ldots \hat{Y}_M-Y_M$) between the plurality of target remixed sound combinations and the plurality of training sound combinations.

FIG. 5B is a flow chart of an example method 550 of unsupervised training of a sound separation model for efficient privacy-respecting audio detection in driving environments, in accordance with some implementations of the present disclosure. Method 550 can be performed using training data for which annotations are available. For example, training data used by method 550 can be staged data generated under controlled conditions of a driving environment in which various sound sources are introduced, e.g., sirens of emergency vehicles, conversation of bystanders (e.g., actors), and/or the like. Operations of method 550 of supervised training can be performed by training server 240 of FIG. 2, e.g., as illustrated in FIG. 3 (with shaded blocks). At block 560, method 550 can include separating, using the sound separation model (e.g., SSM 132), one or more ESs (e.g., $\hat{X}_1 \ldots \hat{X}_K$) from a training sound combination (e.g., Y). At block 570, method 550 can continue with obtaining a set of permutations of the one or more separated ESs (e.g., permutations $\{\hat{X}_1, \hat{X}_2, \hat{X}_3\}$, $\{\hat{X}_1, \hat{X}_3, \hat{X}_2\}$, $\{\hat{X}_2, \hat{X}_3, \hat{X}_1\}$, etc., if the sound separation model has identified that K=3 ESs are present in the training sound combination). At block 580, method can include identifying a target permutation (e.g., $\{\hat{X}_2, \hat{X}_3, \hat{X}_1\}$) of the set of permutations, the target permutation most closely resembling a target lineup of ground truth ESs (e.g., $\{X_2, X_3, X_1\}$) for the training sound combination. At block 590, method 550 can include modifying parameters of the sound separation model to reduce a mismatch between ESs of the target permutation and the target lineup of ground truth ESs.

FIG. 6 is a flow chart illustrating another example method 600 of using sound detection for privacy-respecting identification and tracking of objects in driving environments, in accordance with some implementations of the present disclosure. At block 610, method 600 can include obtaining, using one or more audio detectors of a vehicle, a first sound recording. The first sound recording can be of a sound produced in a driving environment of the vehicle. At block 620, method 600 can include generating, using the first sound recording, a second sound recording. The second sound recording can render imperceptible a speech present or potentially present in the first sound recording.

Making speech imperceptible can be performed using one or more of a variety of techniques illustrated in callout blocks 622-628. More specifically, at block 622, method 600 can include eliminating one or more portions from the first sound recording, the one or more eliminated portions having been recorded with the vehicle moving with a speed that is less than a threshold speed, e.g., 15 mph, 20 mph, 25 mph, or some other threshold speed, which can be empirically determined and can depend on a specific model/type of the vehicle, placement of audio sensors, type of an environment (e.g., urban big city, urban small city, suburban, rural, etc.), and/or the like.

At block 624, method 600 can include redacting, according to a predetermined redaction schedule, a plurality of temporal segments of the first sound recording, e.g., redacting every 0.4 sec, 0.5 sec, and/or the like, of every 1.0 sec of the first sound recording.

At block 626, method 600 can include processing, using a sound classification model, the first sound recording to identify one or more portions of the first sound recording that captured speech. Method can then include, at block 628, redacting the one or more identified portions of the first sound recording. In some implementations, the sound classification model can be trained using a plurality of sound recordings that record speech in one or more noisy outdoor settings. For example, the plurality of sound recordings used for training of the sound classification models can be (or include) publicly available recordings of speech in outdoor settings (e.g., YouTube® videos). At least some of the sound recordings can be made in settings that are different from typical vehicle environments.

At block 630, method 600 can include processing the second sound recording to obtain an indication of presence of a sound-producing object in the driving environment of the vehicle. In some implementations, such processing can be performed by applying a sound classification model (e.g., the sound classification model used at block 626). In some implementations, the sound-producing object can be or include an emergency vehicle.

At block 640, method 600 can continue with causing a driving path of the vehicle to be modified in view of the indication of presence of the sound-producing object. Operations of block 640 can be performed similarly to operations of block 440 of method 400 (illustrated in FIG. 4).

Figure 7:
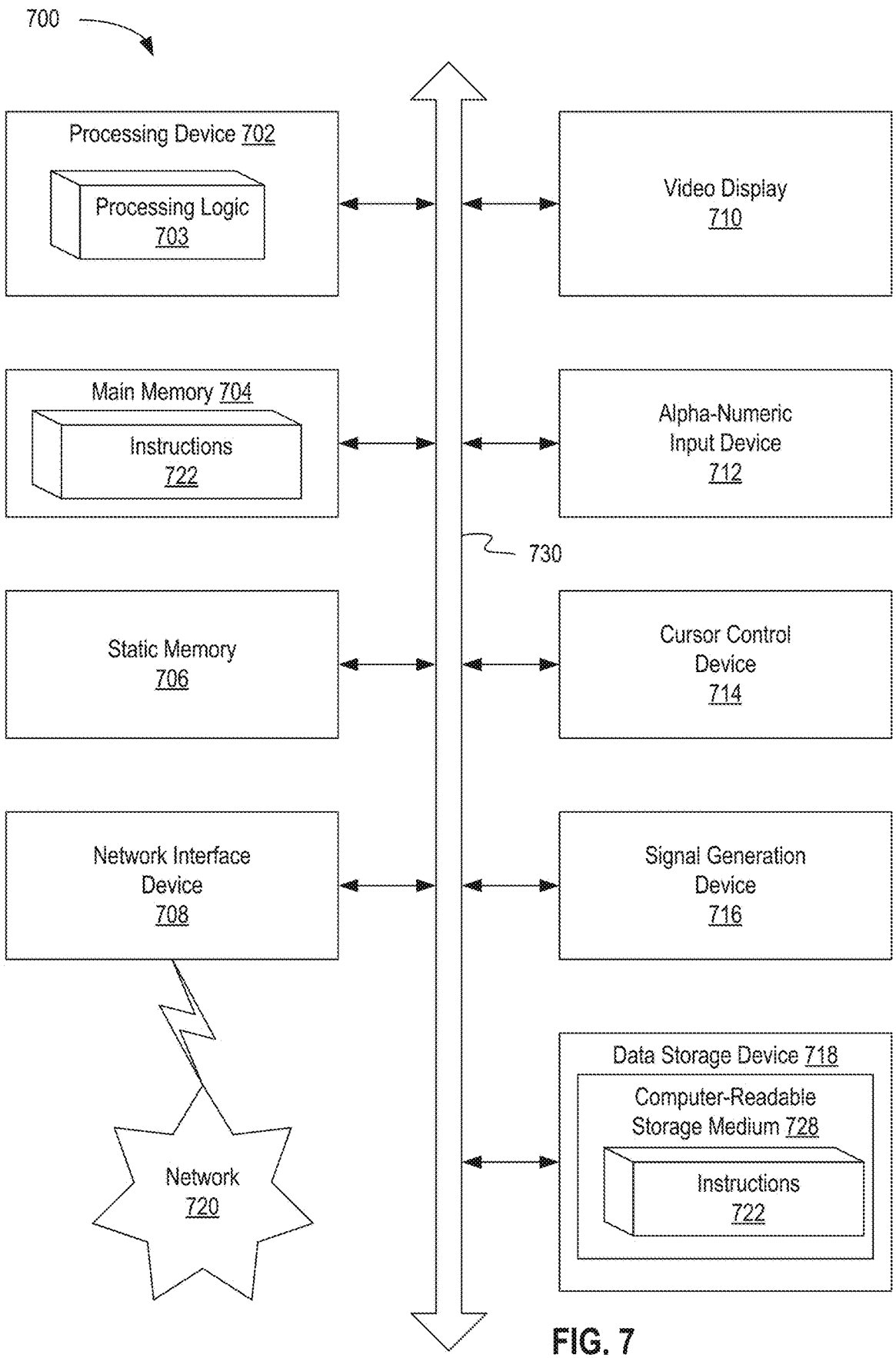
FIG. 7 depicts a block diagram of an example computer device capable of supporting sound separation techniques that respect private conversations while allowing efficient detection and identification of sound-producing objects in vehicle environments, in accordance with some implementations of the present disclosure.

FIG. 7 depicts a block diagram of an example computer device 700 capable of supporting sound separation techniques that respect private conversations while allowing efficient detection and identification of sound-producing objects in vehicle environments, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 400 of method of using a sound separation model for privacy-respecting identification and tracking of objects in driving environments, method 500 of unsupervised training of a sound separation model for efficient privacy-respecting audio detection in driving environments, method 550 of unsupervised training of a sound separation model for efficient privacy-respecting audio detection in driving environments, and/or method 600 of using sound detection for privacy-respecting identification and tracking of objects in driving environments.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 400 of method of using a sound separation model for privacy-respecting identification and tracking of objects in driving environments, method 500 of unsupervised training of a sound separation model for efficient privacy-respecting audio detection in driving environments, method 550 of unsupervised training of a sound separation model for efficient privacy-respecting audio detection in driving environments, and/or method 600 of using sound detection for privacy-respecting identification and tracking of objects in driving environments.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying" "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    obtaining, using one or more audio detectors of a vehicle, a sound recording comprising a plurality of elemental sounds (ESs) in a driving environment of the vehicle;
    processing, by a processing device and using a sound separation model, the sound recording to generate, for each ES of the plurality of ESs, a representation of a respective ES, the representation comprising at least one of:
        a segment of the sound recording corresponding to the respective ES,
        a mask that, when applied to the sound recording, selects a portion of the sound recording corresponding to the respective ES, or
        an embedding generated by a respective output channel of the sound separation model and encoding the respective ES;
    identifying a content of a first ES of the plurality of ESs using a representation of the first ES; and
    causing, by the processing device, a driving path of the vehicle to be modified by outputting control instructions generated in view of the identified content of the first ES, to at least one of:
        a powertrain system of the vehicle, or
        a steering system of the vehicle.

2. The method of claim 1, wherein identifying the content of the first ES comprises:
    identifying, using a sound classification model, that the first ES comprises a signal of an emergency vehicle.

3. The method of claim 2, further comprising:
    estimating, using the content of the first ES, at least one of:
        a location of the emergency vehicle at a first time, or
        a relative velocity of the emergency vehicle at a first time.

4. The method of claim 3, further comprising:
    identifying an additional content of at least one ES of an additional plurality of ESs; and
    estimating, using the additional content, at least one of:
        a change of the location of the emergency vehicle between the first time and a second time, or
        the relative velocity of the emergency vehicle at the second time.

5. The method of claim 1, further comprising:
    determining that a second ES of the plurality of ESs comprises a private speech; and
    causing a sound buffering with the second ES to be discarded.

6. The method of claim 1, further comprising:
    determining that a second ES of the plurality of ESs comprises noise; and
    causing a sound buffering with the second ES to be discarded.

7. The method of claim 1, wherein identifying the content of the first ES comprises:
    identifying, using a sound classification model, that the first ES comprises a speech directed at the vehicle.

8. The method of claim 7, further comprising:
    determining that the speech directed at the vehicle comprises a driving path instruction issued by an authority; and
    causing the driving path of the vehicle to be modified in view of the driving path instruction.

9. The method of claim 1, wherein the sound separation model is trained using:
    identifying, using the sound separation model, one or more ESs of a plurality of training sound combinations;
    obtaining a set of remixed sound combinations, each of the set of remixed sound combination comprising one or more identified ESs;
    identifying a plurality of target remixed sound combinations most closely resembling the plurality of training sound combinations; and
    modifying parameters of the sound separation model to reduce a mismatch between the plurality of target remixed sound combinations and the plurality of training sound combinations.

10. The method of claim 1, wherein the sound separation model is trained using:
    separating, using the sound separation model, one or more ESs from a training sound combination;
    obtaining a set of permutations of the one or more separated ESs;
    identifying a target permutation of the set of permutations, wherein the target permutation most closely resembles a target lineup of ground truth ESs for the training sound combination; and
    modifying parameters of the sound separation model to reduce a mismatch between ESs of the target permutation and the target lineup of ground truth ESs.

11. A method comprising:
    obtaining, using one or more audio detectors of a vehicle, a first sound recording of a sound in a driving environment of the vehicle;
    generating, using a processing device and the first sound recording, a second sound recording, wherein the second sound recording renders imperceptible a speech present or potentially present in the first sound recording;
    processing, using the processing device, the second sound recording to obtain an indication of presence of a sound-producing object in the driving environment of the vehicle; and
    causing, by the processing device, a driving path of the vehicle to be modified in view of the indication of presence of the sound-producing object.

12. The method of claim 11, wherein generating the second sound recording comprises:
eliminating one or more portions from the first sound recording, wherein the one or more eliminated portions have been recorded with the vehicle moving with a speed that is less than a threshold speed.

13. The method of claim 11, wherein generating the second sound recording comprises:
redacting, according to a predetermined redaction schedule, a plurality of temporal segments of the first sound recording.

14. The method of claim 11, wherein generating the second sound recording comprises:
processing, using a sound classification model, the first sound recording to identify one or more portions of the first sound recording, the one or more portions comprising speech; and
redacting the one or more identified portions of the first sound recording.

15. The method of claim 14, wherein the sound classification model is trained using a plurality of sound recordings comprising speech in one or more noisy outdoor settings.

16. The method of claim 11, wherein the sound-producing object comprises an emergency vehicle.

17. A system comprising:
a sensing system of a vehicle, the sensing system comprising one or more audio detectors to:
obtain a sound recording comprising a plurality of elemental sounds (ESs) generated in a driving environment of the vehicle; and
a perception system of the vehicle, wherein the perception system is to:
process, using a sound separation model, the sound recording to generate, for each ES of the plurality of ESs, a representation of a respective ES;
identify a content of a first ES of the plurality of ESs using a representation of the first ES; and
cause a driving path of the vehicle to be modified in view of the identified content of the first ES.

18. The system of claim 17, wherein to identify the content of the first ES, the perception system is to:
identify, using a sound classification model, that the first ES comprises a signal of an emergency vehicle.

19. The system of claim 17, wherein the perception system is further to:
determine that a second ES of the plurality of ESs comprises at least one of a private speech of a noise; and
cause a sound recording with the second ES to be discarded.

20. The system of claim 17, wherein the perception system is further to:
identify, using a sound classification model, that the first ES comprises a speech directed at the vehicle;
determine that the speech directed at the vehicle comprises a driving path instruction issued by an authority; and
cause the driving path of the vehicle to be modified in view of the driving path instruction.

* * * * *